May 29, 1962 A. V. VDOLEK 3,036,431
THRUST REVERSER FOR JET ENGINES
Filed Sept. 8, 1959 8 Sheets-Sheet 1

INVENTOR.
ALEXANDER V. VDOLEK
BY
Reynolds, Beach & Christensen
ATTORNEYS

May 29, 1962 A. V. VDOLEK 3,036,431
THRUST REVERSER FOR JET ENGINES
Filed Sept. 8, 1959 8 Sheets-Sheet 5

INVENTOR.
ALEXANDER V. VDOLEK
BY
Reynolds, Beach & Christensen
ATTORNEYS

May 29, 1962    A. V. VDOLEK    3,036,431
THRUST REVERSER FOR JET ENGINES
Filed Sept. 8, 1959    8 Sheets-Sheet 6

INVENTOR.
ALEXANDER V. VDOLEK
BY
Reynolds, Beade & Christensen
ATTORNEYS

May 29, 1962 A. V. VDOLEK 3,036,431
THRUST REVERSER FOR JET ENGINES
Filed Sept. 8, 1959 8 Sheets-Sheet 7

INVENTOR.
ALEXANDER V. VDOLEK
BY
Reynolds, Beach & Christensen
ATTORNEYS

May 29, 1962 A. V. VDOLEK 3,036,431
THRUST REVERSER FOR JET ENGINES
Filed Sept. 8, 1959 8 Sheets-Sheet 8

INVENTOR.
ALEXANDER V. VDOLEK
BY
Reynolds, Beach & Christensen
ATTORNEYS

United States Patent Office 3,036,431
Patented May 29, 1962

3,036,431
THRUST REVERSER FOR JET ENGINES
Alexander V. Vdolek, Bellevue, Wash., assignor to Boeing Airplane Company, Seattle, Wash., a corporation of Delaware
Filed Sept. 8, 1959, Ser. No. 838,494
6 Claims. (Cl. 60—35.54)

This invention relates to improvements in reversible-thrust nozzles for jet propulsion engines, particularly ducted fan-type turbojet engines. In general the invention is directed to improved means for interrupting the rearward flow of gases through a duct or ducts of substantially annular cross section and diverting such flow outwardly and forwardly therefrom. The novel improvements are herein illustratively described by reference to the presently preferred embodiments of the invention; however, it will be recognized that certain modifications and changes therein with respect to details may be made without departing from the underlying essentials.

An important object herein is to provide reverser nozzles for ducted fan-type turbojet engines which are relatively light in weight, compact, easily operated, simple and reliable. Compactness of the reverser mechanism particularly in a transverse or radial sense is of critical importance because it permits housing the same in a radially thin annular interwall space and thereby minimizes overall engine cross section upon which drag is so directly dependent.

Another important object is to provide such reverser apparatus with ducting elements and deflectors which are aerodynamically efficient in both cruise and reverse thrust. In cruise, the improved nozzle construction offers clean and unbroken flow lines, both interior and exterior, whereas in the reverse thrust setting efficient diversion of gases or air in the forward direction is obtained with a relatively simple and reliably actuated deflector system.

A further object is such a mechanism which is relatively fail-safe in reverse thrust, in cruise, and in intermediate settings. The mechanism tends to remain in its assigned setting due to the manner in which air and gas pressure act upon movable surfaces in the mechanism, so that in the event of an actuating means failure dangerous and unpredictable shifting of nozzle parts does not occur.

Another object is a simplified reverser nozzle mechanism the parts of which, by reliance upon air or gas pressure, are constrained to operate in a reliably definite sequence and to maintain substantially constant load on the engine during transitions between settings.

A further object is to provide efficient thrust reversing mechanism with efficient sealing arrangements capable of handling, with minimal leakage, the relatively high-volume mass flow and high-pressure requirements of engines of advanced design. It is an object to provide a compact and simple seal arrangement associated with the reversing deflectors, cowl ring, and duct wall which provides a substantially continuous seal between the cowl ring and fan duct outer wall in forward thrust and between such ring and the reversing deflectors in reverse thrust, with seal elements serving in a dual capacity.

The improved thrust reverser nozzle means includes a substantially annular cowl ring normally drawn forward into abutment with the cowl proper to present a continuous discharge duct outer wall expanding rearwardly in diameter within the engine nacelle. Rearward extension movement of this cowl ring, effectuated by actuators, opens a side gap in the cowl permitting lateral and forward discharge of air or gas diverted from its normal rearward flow into an outward and forward direction by reversing deflectors or doors which are swung rearwardly and inwardly upon completion of the cowl ring extension stroke. By reason of a novel linkage and guide mechanism including the reversing deflectors themselves, the initial actuator movement shifts the cowl ring aft, whereas final movement of the same actuators extends the reversing deflectors. This definite sequence occurs in reverse on retraction of the elements into forward thrust. In both directions of movement gas pressure acting on the cowl ring and reversing deflectors causes the movement to occur in a definite sequence and makes possible mechanical simplification and corresponding savings of space and weight. To these ends longitudinal guide means are connected to the forward, outer portions of the reversing deflectors and special linkage connections between rearwardly located points on the deflectors and on the cowl ring respectively.

A further feature resides in a substantially annular sealing means including a sealing element carried by the forward end of the cowl ring and, expandable by air or gas pressure bled from the discharge duct, cooperable alternatively with the mating edge of the duct forwardly thereof (in the forward position of the cowl ring) and with a sealing flange on the after sides of the reversing deflectors in the extended or reverse-thrust position thereof, thereby to effect a substantially continuous seal between abutting parts in either setting of the nozzle.

These and other features, objects and advantages of the invention will become evident or more fully evident from the description which follows based on the accompanying drawings.

Referring to the embodiment shown in FIGURES 1 through 8, the engine 10 carried by the mounting strut 12 is a ducted-fan type jet engine of the so-called short duct type. Such engines, now becoming commercially available, are essentially a modification of the turbojet engine. One or more fan stages are substituted for the initial compressor stages, with additions to the size and/or number of turbine stages, to drive the fan, and with a discharge duct or ducts provided in the forward diffuser cowl structure just aft of the fan. Driven air from the inner regions of the fan flows rearwardly through the compressor stages and to the burners, following which the hot gases of combustion pass rearwardly through the turbine stages and finally out the aft nozzle of the jet engine. Fan-driven air from the outer regions of the fan discharges directly through the forwardly located fan duct or ducts to augment jet thrust. These engines reduce the gas volume required to be handled by the jet nozzle, yet handle greater volumes of air and develop greater total thrust for a given size and weight of the engine, than a comparable turbojet engine. Such engines are quieter, have more thrust in take-off, climb and cruise, and attain higher total engine efficiency than comparable turbojet engines of conventional design. However, because of the peculiar problems of cowl and duct configuration and placement, as well as the great importance attached to slim lines in these engines, a number of serious problems have been presented in the design and construction of thrust reversing nozzles, both for the aft or jet nozzle and for the fan duct nozzle, as mentioned above.

Figure 1:
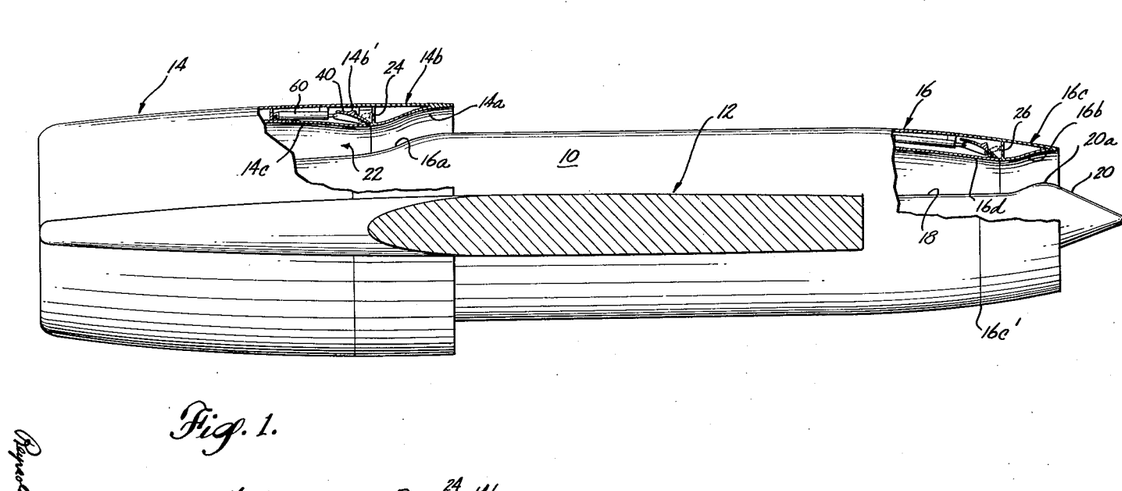
FIGURE 1 is a top view of a ducted fan jet engine of the short duct type with the nozzle improvements, the viewing being taken in section through the supporting strut by which the engine is to be supported beneath an airplane wing, parts of the nozzle structure being broken away to show details of certain parts positioned in the forward-thrust setting of the nozzles.
Figure 2:
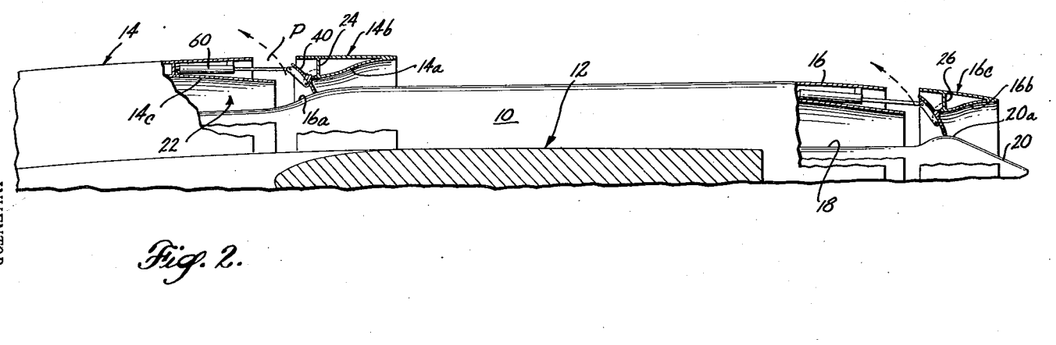
FIGURE 2 is a similar view on one side of the vertical longitudinal mid-plane showing the nozzles in reverse thrust.

In FIGURES 1 and 2 only those parts of the engine required to be depicted for purposes of understanding the present invention have been shown, the fan rotor, the compressor, the burners, the turbines, the controls and other secondary components being omitted from the illustration. As will be recognized, the engine fan is mounted in the enlarged forward or diffuser portion 14 of the engine cowl. Surrounded by the after portion of the diffuser cowl 14 and projecting rearwardly therefrom is the main cowl 16 of relatively slim, elongated proportions. Within the main cowl 16 and projecting rearwardly from the turbine assembly (not shown) is the island 18 which terminates in the enlarged plug or tail cone 20 of conventional form and construction. The mutually overlapping and concentrically related portions of the diffuser cowl 14 and main cowl 16 define between them a substantially annular discharge passage 22 which represents the short fan duct. In some cases, this duct may be substantially annular in form extending around the entire circumference of the engine except, in some cases, for the obstructed portion occupied by elements of strut 12, whereas in other cases it may comprise a single but circumferentially short duct or a number of such short ducts arranged at angularly spaced stations about the periphery of the engine. The principles of construction for present purposes are largely unaffected by the choice of duct form in that regard.

At the discharge orifice or exit of the fan duct 22 the exterior wall of the main duct 16 is expanded rearwardly at 16a, whereas the inside wall of the diffuser cowl 14 undergoes a similar expansion at 14a so as to define, cooperatively with the expanded duct surface 16a, a substantially annular discharge passage or orifice, the average radius of which increases progressively in a rearward direction. The multifold purpose of this configuration includes the provision, within the main cowl 16, of importantly needed space for engine components around the outside wall of the compressor stages (not shown), but primarily, for reasons of fail-safe operation of the reverser mechanism, converts the pressure head of the discharging air into a forwardly directed holding force acting against inner surface 14a of the longitudinally movable diffuser cowl section or ring 14b, as will be more fully explained hereinafter. Similarly, the jet orifice opening at the after end of the engine is formed by a protuberance or enlargement 20a comprising the base of tail cone 20, and by a complementally expanded outer orifice wall portion 16b, such that the mean radius of the annular jet discharge orifice defined between these components increases progressively to the rear.

Figures 3, 5:
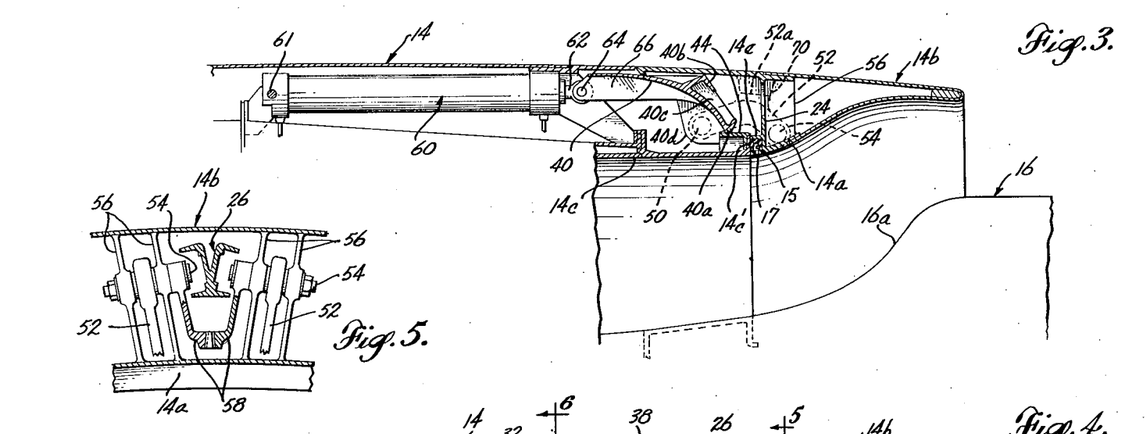
FIGURE 3 is a fragmentary longitudinal sectional view of the fan duct, or forward, nozzle unit at larger scale, the view being taken in an axial plane which shows an actuator jack in full with the nozzle mechanism in forward thrust.
FIGURE 5 is a transverse sectional detail taken on line 5—5 of FIGURE 4 and showing suitable coordinating mechanism for adjacent reversing deflectors.

In the forward-thrust setting of the fan duct nozzle, cowl ring 14b abuts the after edge of the stationary forward portion of the diffuser cowl 14. In this position the cowl ring surfaces are smoothly contiguous to cowl surfaces proper. Similarly, the jet nozzle duct exterior surface portion 16b represents the inside surface of a longitudinally movable cowl ring 16c, which, in forward thrust, abuts the rear edge of the main cowl 16 in smoothly contiguous relationship. In the forward thrust position of the cowl ring, loss of air through the crack or juncture between mutually abutting edges of the cowl ring interior wall 14c and the interior wall of the stationary portion of diffuser duct 14 is prevented by providing an expandable channel-shaped rubber-like seal 15 which opens radially inwardly and extends around the interior of a circumferential channel 14e formed on the inside forward edge of the cowl ring 14b. Breather holes 17 formed in the wall 14a admit pressurized air from the fan duct space into the interior of the expanding channel-shaped seal ring 15 in order to press the flanges of the seal ring against the opposing surfaces of the bulkhead 24 and the structural flange 14c' on the after end of the wall portion 14c (FIGURE 3).

The outer wall of cowl ring 14b is substantially cylindrical or undergoes a very minor degree of taper to the rear, whereas the rear portion of its inside wall, including cowl ring surface 14a, undergoes a relatively rapid expansion to the rear. Consequently, for compactness and strength, the cowl ring 14b is wedge-shaped in cross-section, with the forward portion thereof being relatively thick and tapering rearwardly to an annular edge. The same applies to the rear cowl ring 16c. A transverse annular stiffener plate 24 interconnects the rearwardly convergent inside and outside wall panels of cowl ring 14b at a location aft of the outside forward edge of such cowl ring, whereas a stiffener 26 performs a similar role at a corresponding location in the aft cowl ring 16c.

Figures 4, 6:
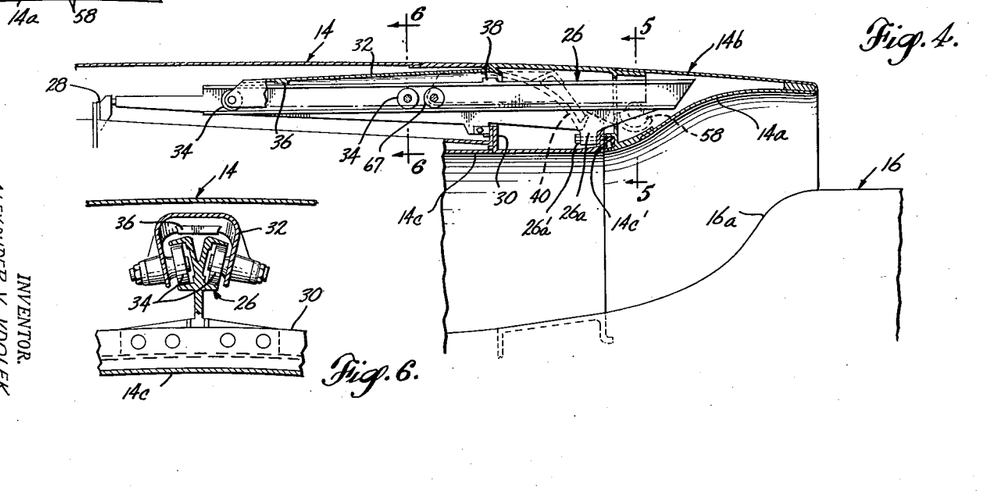
FIGURE 4 is a view similar to FIGURE 3 but with the axial plane rotated about the engine axis to show in full one of the two guide units associated with each of the reversing deflectors and orifice-cowl ring.
FIGURE 6 is a transverse sectional detail taken on line 6—6 in FIGURE 4 and showing the track and roller guide means for an orifice-cowl wall section, together with certain track and guide arm details.
Figure 7:
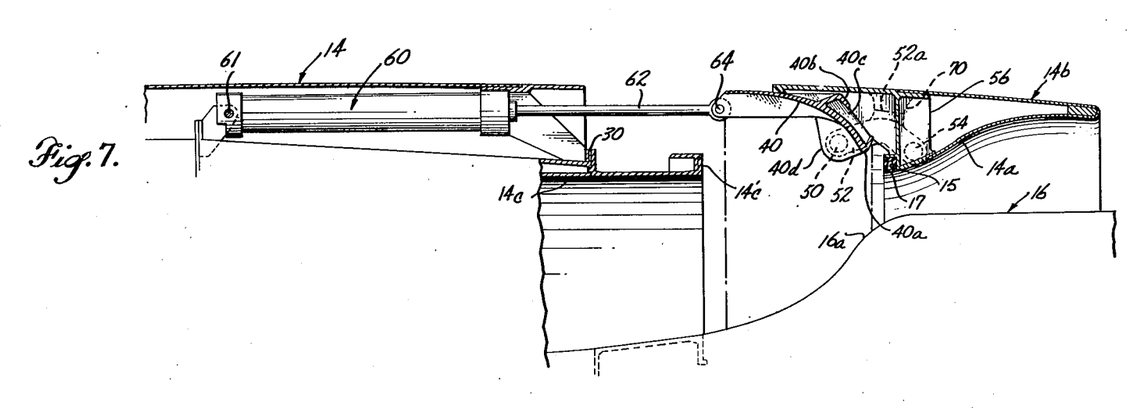
FIGURE 7 is a view similar to FIGURE 3 with the nozzle parts partially extended into reverse thrust.

Support and guidance for longitudinal movement of the cowl rings 14b and 16c are provided by substantially the same means; hence, a description of the apparatus associated with the forward or fan duct cowl ring 14b will suffice for both. Referring particularly to FIGURE 4, at a number of stations spaced apart about the circumference of the diffuser cowl 14, and mounted within the space defined between its inside and outside walls, are mounted longitudinally extending track-type guides 26 fixed at their forward ends to an annular structural member 28 and, at a location intermediate their ends, to an annular flange structure 30. Additional track support is derived from the lugs 26a which project radially inwardly from the after end portions of the guide tracks and are bolted at 26a' to the duct wall flange 14c'. These tracks 26 project rearwardly into the interior of the double-wall cowl ring 14b positioned in forward thrust, for which purpose suitable openings are allowed in the cowl ring stiffener plate 24. Cantilever guide arms 32, structurally integral with the cowl ring 14b, project forwardly therefrom at the guide track locations and carry sets of rollers 34. One set is located at the forward end of each guide arm and the other set is located rearwardly thereof but at a location situated forwardly of the cowl ring 14b. There are two rollers in each set, each engaging one of the two oppositely facing channels in the guide track 26, as shown best in FIGURE 6. A stop 36 mounted at a forward location on each guide arm 32 is disposed to engage a cooperative stop 38 mounted on the associated guide track 26 in such a position as to limit rearward travel of the cowl ring 14b at the desired reverse-thrust position thereof. Such a mechanism comprising a plurality of longitudinal guide tracks spaced at intervals about the periphery of the engine and within its cowl walls, together with the roller-mounted cantilever support arms, provides a very rigid and easily actuated mechanism to support and guide the cowl ring. Strength and compactness in the interrelated structural forms of the cantilever arms and tracks is achieved by employing channel-shaped arms 32 which embrace the track, and by providing transversely angled track channels, as shown in FIGURE 6, it being particularly desirable to maintain a slim overall engine exterior form.

Figure 8:
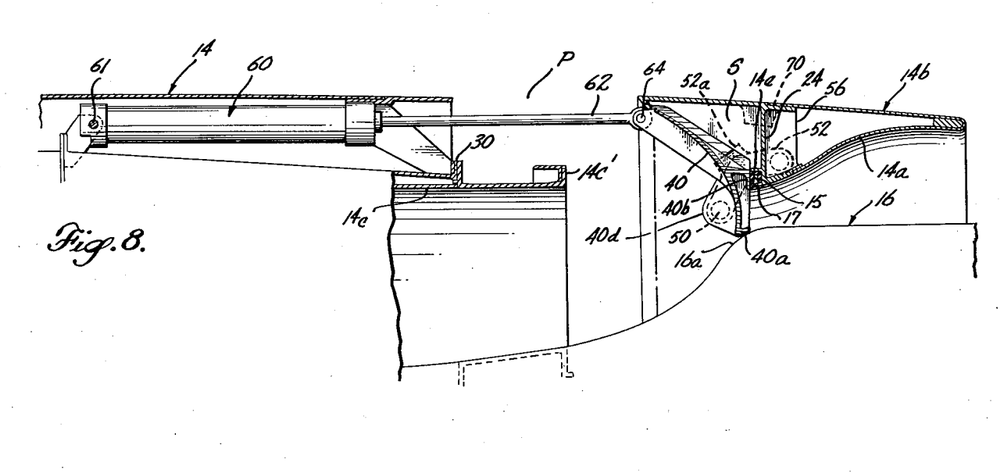
FIGURE 8 shows them fully in reverse thrust.

An annular gap or side port P is opened in the diffuser cowl 14 by rearward positioning of cowl ring 14b (FIGURES 2 and 8). Air driven under pressure by the engine fan and normally flowing rearwardly through the fan duct orifice between wall portions 14a and 16a to augment forward thrust is now diverted outwardly and forwardly through this gap to produce reverse thrust, as suggested by the dotted arrow in FIGURE 2. In order to divert the air in this manner, a plurality of normally retracted reversing doors or deflectors 40 are now swung inwardly and disposed obliquely across the duct space defined between the forward edge of the rearwardly shifted cowl ring 14b and a circumferential line on the main cowl portion 16a which is located somewhat to the rear of such forward edge, in order to obstruct rearward flow through the fan duct. The reversing deflectors 40, which extend in successively adjacent series relationship about the circumference of the fan duct, with ends substantially abutted to provide an effective seal against rearward escape of driven air past them, are inclined outwardly and forwardly and have a slight forward concave curvature in longitudinal axial planes to deflect the intercepted air in an outward and forward sense to produce reverse thrust with minimum energy loss from turbulence. The aerodynamic considerations determining the curvature and angular positioning of these reversing deflectors in relation to the engines' longitudinal axis will be apparent to those skilled in the art based upon the illustration thereof in FIGURES 7 and 8 which show what is presently considered to be substantially the optimum form and relationship of parts for this purpose.

With the reversing deflectors 40 in their fully extended thrust-reversal position as shown in FIGURES 2 and 8, surface contact is established between their radially inner edges 40a and the cowl surface 16a to block passage of air to the rear at this location. Passage of air around their outside edges and into the interior space S defined between front side of the bulkhead 24 and the inside of the forwardly extending outside wall of cowl ring 14b is blocked against entry into the duct space formed between orifice walls 16a and the exterior of cowl 16 by contact between the gland or seal elements 14e, 15 and an offset flange 40b formed on the rear side of each reversing deflector 40 as shown (FIGURE 8). Side flanges 40c on successively adjacent reversing deflectors 40 come into substantially surface-to-surface contact in the reverse-thrust setting. Thus, virtually all rearward flow of air is cut off and such air is permitted to flow laterally outward and forwardly through the side port P in order to generate maximum reverse thrust.

In the normal or nested position of the reversing deflectors 40, as shown in FIGURE 3 for example, they are drawn forwardly and outwardly into the enclosed space formed between the fan duct outer wall 14c and the outer wall of the diffuser duct 14 wherein they extend generally longitudinally. In this position their inner edges 40a lie in sliding supported contact with peripheral surface portions of a collar member 44 secured to the flange 14c'.

Opposite side edges of the reversing deflectors 40 are provided with lugs 40d which project radially inwardly therefrom and serve as supports for pivots 50 by which such deflectors are connected to the forward, outer ends of the dog-leg links 52. The opposite or inner ends of these links are connected by pivots 54 to the longitudinal ribs 56 which extend in successive radial planes between the inner and outer walls of the cowl ring 14b as shown (FIGURES 3 and 5). The side flanges on the individual reversing deflectors 40 carry rollers 67 which engage the adjacent channels of guide tracks 26 in order to provide definite guidance fore and aft for the forward edges of the deflectors. Guidance for movement of the rearward edges of these deflectors is established through the medium of the guided cowl ring 14b and the connecting links 52. Preferably the links 56 of successively adjacent deflectors are constrained to pivot together or conjointly by fixing them rigidly upon their pivot shafts 54 and interconnecting such shafts for conjoint rotation by means of intermeshed sector gears 58 also rigid with the respectively adjacent shafts, so that the reversing deflectors are required to move simultaneously despite any slight difference in actuation forces applied to them by their actuating means, which in the preferred form comprises the pneumatic or hydraulic jacks 60, one associated with each such deflector. The forward end of each jack cylinder is pivotally mounted on a transversely disposed shaft 61 at its forward end whereas the oppositely located piston rod 62 of such jack is pivotally connected at 64 to a transversely centered stiffener rib 66 mounted on the inside face of the associated deflector 40. While it is preferred to employ a separate actuating jack 60 for each of the reversing deflectors, fewer jacks may be used if desired, particularly in view of the synchronizing mechanism comprising the sector gears 58 or other coordinating means assuring simultaneous movement of the deflectors.

It should be noted that each link 52 carries on its outer side intermediate its ends a supporting pad or stop 52a which bears in contact with an abutment 70 projecting inwardly toward it from the outer wall of the cowl ring 14b. Thus, the outwardly acting force of air pressure on the reversing deflectors 40 is normally borne directly by the structure of the cowl ring 14b through these links and cooperating abutments.

An important additional feature of the invention is the cooperative relationship of the reversing deflectors 40, the cowl ring 14b and the interconnecting links 52 with respect to control of operating movements of the thrust reversal mechanism. Actuation of the cowl ring 14b to its extended or thrust-reversal position (i.e., from the position in FIGURE 3 to the position in FIGURE 7) is caused to occur before the reversing deflectors 40 are swung into their obliquely disposed reversing position (FIGURE 8), yet the total sequence is effected by the same actuators, i.e., the jacks 60. To this end the pivot 50 at one end of each link 52 is located slightly nearer the extended axis of the jack 60 than the opposite pivot 54. Consequently, when extension movement of the jack 60 takes place from the position shown in FIGURE 3, the deflector 40 serves as a link in tandem with the associated links 52 to extend the cowl ring 14b. The extension forces applied to the links 52 have effective moment arms which tend to rotate the links in a clockwise direction (FIGURE 3) and are assumed by the reaction pads 52a and 70. The fully extended position of the cowl ring 14b is reached when the stops 36 and 38 interengage, at which point (FIGURE 7) further extension movement of the actuators 60 causes the reversing deflectors 40 to shift inwardly to their thrust-reversal position (FIGURE 8). This is made possible because the pivot 50 is located inwardly from the line which interconnects the pivots 54 and 64. Because of this offset of pivot 50, when the cowl ring is arrested the thrust of the jack 60 gives rise to a moment which now overcomes the opposing moment acting on the deflector 40 due to air pressure bearing outwardly thereon. Previously, during the initial extension movement of the jack, when the cowl ring 14b was being moved to its aft position, inward swinging of the deflectors 40 was prevented by virtue of the counterclockwise torque applied to the links 52 due to the inward offset of pivot 50 in relation to the line interconnecting pivots 64 and 54 being less than the clockwise torque which is exerted on such links due to the outwardly acting pressure of the air bearing against the deflectors 40. Thus, the deflectors 40 and links 52 serve as an essentially rigid thrust transmission assembly for assuring definite sequential action initiated by full extension of the cowl ring 14b.

On retraction, the reverse sequence must be followed, involving initial retraction of the deflectors 40 followed by retraction of the cowl ring 14b. Here, again, the gas forces come into play to assure the required operating sequence. In this case, viewing FIGURE 8, there is a strong rearwardly acting force of air bearing on the inwardly disposed deflectors 40 which results in thrust load borne by the links 52 in a rearwardly directed sense. This thrust load is imparted to the cowl ring 14b urging it into its established extended position as shown. As the jack 60 contracts, the forward edges of the deflectors 40 are drawn forwardly but this thrust load on the links is not removed because the deflectors are caused to pivot about their forward edges, guided by the rollers 67 in tracks 26, whereas the opposite or trailing ends of such deflectors are free. However, at such point (FIGURE 7) as the deflectors are swung outwardly into substantial alignment with the line of force of the jack, the abutments 52a and 70 come into contact and the swinging movement of the deflectors 40 about the pivots 64 is arrested, so that continued retraction of the actuator 60 then, but not before then, causes forward movement of the cowl ring 14b toward its retracted position (FIGURE 4).

It is also important to note that the mechanism tends to remain in any assigned position, which is of considerable advantage as a fail-safe feature. In the extended or thrust-reversal position shown in FIGURE 8, for example, the air forces acting on the deflectors 40 urge them rearwardly and thereby urge their inner edges into continuing contact with the surface of cowl 16 and urge their outer ends rearwardly, hence any failure of the actuators 60 to operate does not result in any change of assigned position of the mechanism. In the forward-thrust position shown in FIGURE 3, on the other hand, the deflectors 40 are not affected by pressure of air flowing through the fan duct defined between surfaces 14a and 16a, whereas there is a definite forward component of force acting on the inside wall surface 14a due to the rearwardly extended form of the interior of cowl ring 14b. This forwardly acting component forces the cowl ring forwardly and thus assures that the mechanism will remain in its forward-thrust setting once it reaches that setting. In intermediate positions such as in FIGURE 7, the oppositely acting forces, i.e., forwardly and rearwardly on the parts of large surface area, namely the deflectors 40 and the cowl ring surface 14a, tend to cancel each other out so that the mechanism tends to remain in such intermediate positions and to offer least resistance to movement effected by the actuators. This permits relatively small actuators to be used and in the event of an actuator failure permits completion of movement toward either setting if any residual force is available in the actuator.

It will be recognized from the foregoing that the complex and heavy louvered guide vanes used in the past to attain thrust reversal efficiently are unnecessary in the present case, that the mechanism is simple and light in weight, and that it requires minimum space measured radially of the engine. It permits a continuous cowl line with correspondingly reduced drag and provides an effective seal for the panel surfaces which form the chambers and duct spaces, with only one seal means required. Moreover, such seal is not required to be of a type involving rubbing contact surfaces but is of the make-and-break contact type which imposes no resistance to movement of the parts between positions and suffers no appreciable wear of parts which contact each other. In essence, the mechanism provides an efficient means for sealing and closing an annular duct in the least possible space measured radially, and for reversing the direction of discharge from that duct.

As previously mentioned, the foregoing description with relation to the fan duct nozzle mechanism applies also to the similar mechanism associated with the jet nozzle at the after end of the engine.

Figure 9:
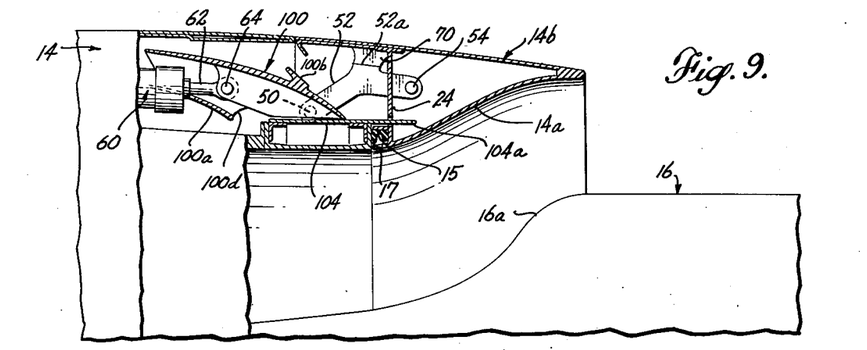
FIGURE 9 is a view generally similar to FIGURE 3 but of a modified nozzle structure in forward thrust.
Figure 10:
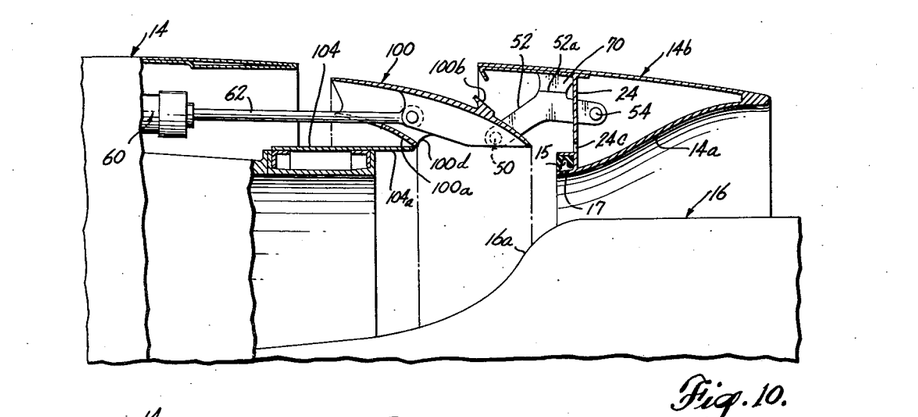
FIGURES 10 and 11 are similar views respectively with the nozzle partially and fully extended into reverse thrust.
Figure 11:
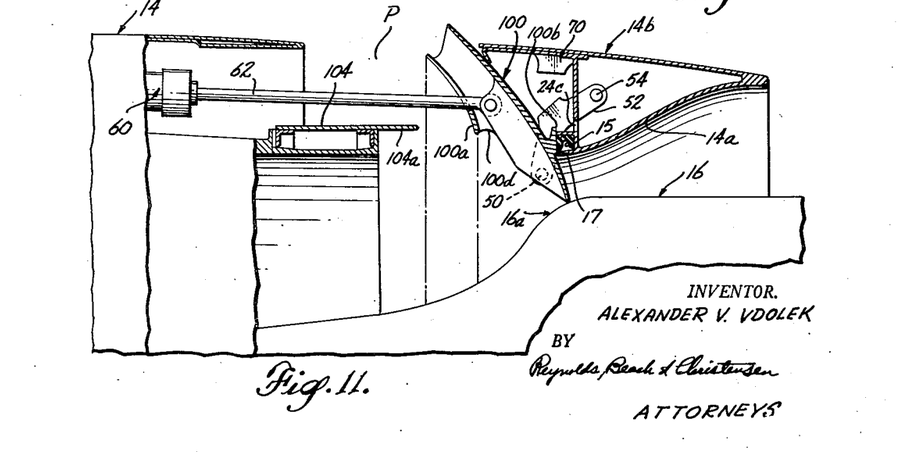
Figures 12, 13, 14:
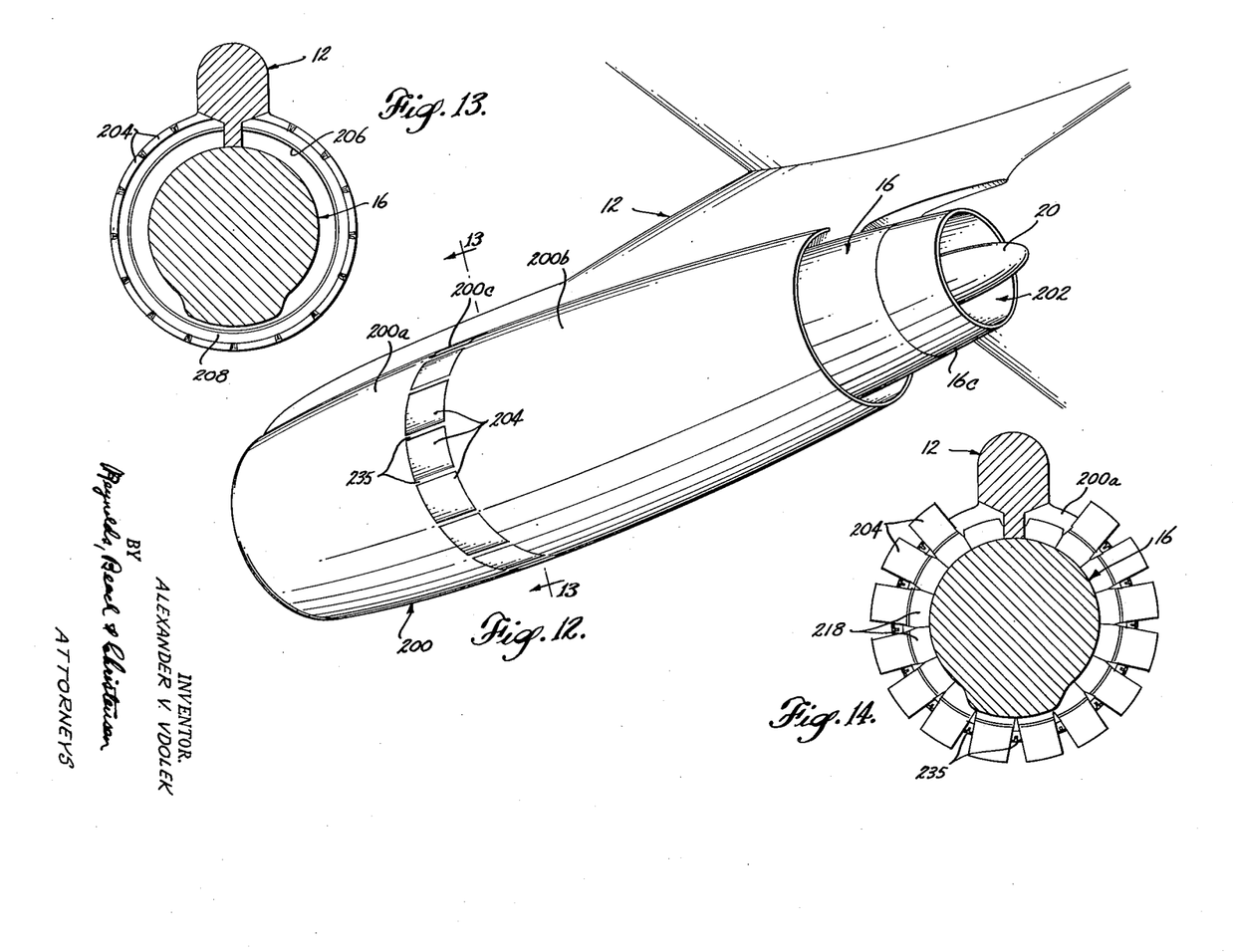
FIGURE 12 is a lower perspective view of a ducted fan jet engine of the long duct type equipped with a modified form of the invention and shown in forward thrust.
FIGURES 13 and 14 are simplified transverse sectional views of the modified engine in forward and reverse thrust, respectively, such views being taken approximately on the line 13—13 in FIGURE 12.
Figures 15, 16:
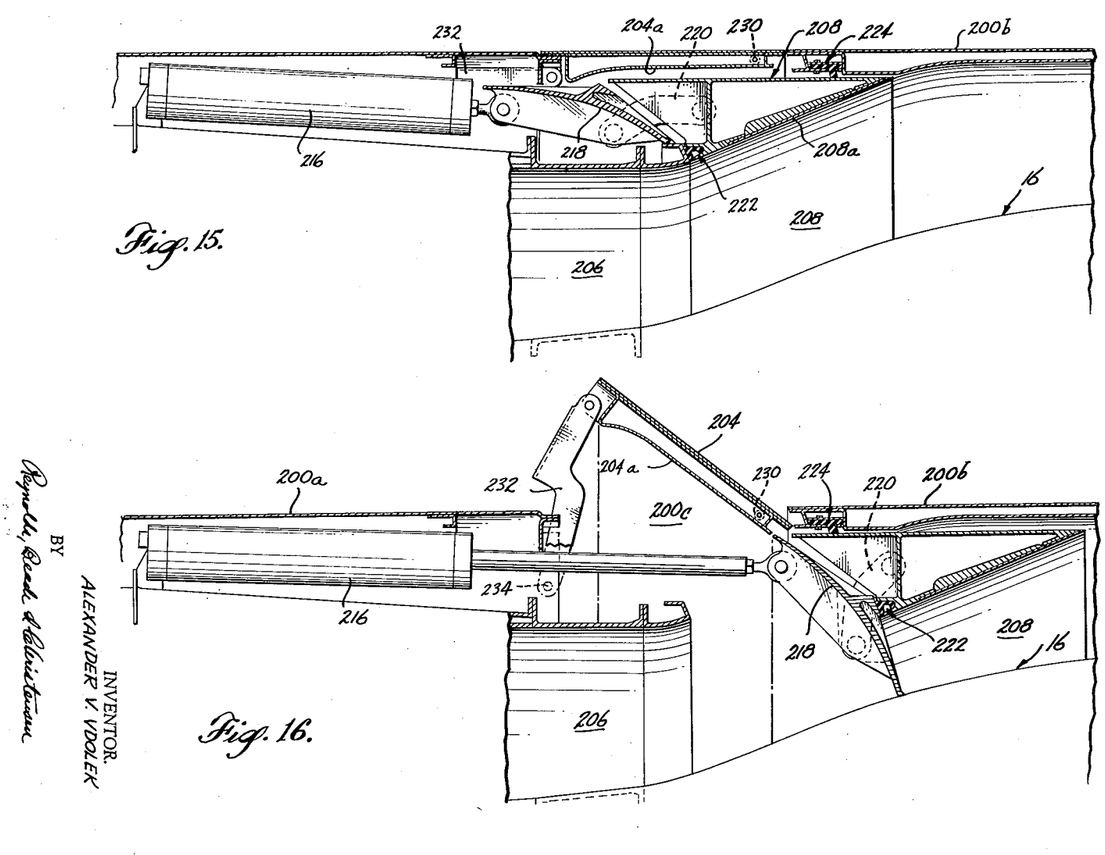
FIGURE 15 is a view generally similar to FIGURE 3 but of the modified forward nozzle structure incorporated in the long-duct engine of FIGURE 12 in forward thrust.
FIGURE 16 shows the same in reverse thrust.

In the modified embodiment shown in FIGURES 9, 10 and 11, parts which correspond to similar parts in the preceding figures are either unnumbered or bear reference numerals which are the same as those in the previous instance. In this embodiment the reversing deflectors 100 are somewhat different in form than those in the preceding case although they are connected to the cowl ring 14b by the same dog-leg link mechanism including the links 52, and have a seal contact element 100b which engages the seal ring 15 in the extended position.

One of the revisions contained in this modification resides in the provision of an additional deflector or curved guide vane 100a disposed generally parallel to and spaced inwardly from each main deflector 100, being supported therewith by side flanges 100d located along opposite edges of the two deflectors. The addition of this deflector 100a provides a somewhat more efficient diversion of fan-driven air into its forwardly directed path for producing reverse thrust. The second deflector 100a is notched centrally to provide space which accommodates the central rib structure to which the pivot 64 is anchored as well as allowing space for the piston rod 62 and the end of the jack cylinder 60.

A second revision incorporated in this modified embodiment is the provision of a longitudinally extending guide surface 104 which, in essence, is an extension or enlargement of the guide member 44 in the preceding embodiment and which is provided in this case with an aft extension or tip in the form of a rod 104a along which the inner, aft edge of the deflector 100 slides during its movement into and from the forward-thrust position shown in FIGURE 9. This guide surface assures more positively the desired sequence of movement of the deflectors 100 and the cowl ring 14b so that the cowl ring must be fully extended or approach full extension before the deflector 100 is free to extend. The inner edge of the additional deflector 100a is also disposed to slide on the surface 104 as depicted in FIGURE 10 to this same end. The provision of this guide means is important for ground test purposes when the engine may not be in operation and it is desired to test the reversing mechanism by use of an auxiliary source of pressure for actuating the jacks 60. An aperture 24c in bulkhead 24 accommodates the rod extension 104a in the forwardly-drawn position of the cowl ring 14b (FIGURE 9).

In case a ducted fan turbojet engine of the long-duct type is used, certain additional modifications are desirable for efficient application of the invention. These are illustrated in FIGURES 12 through 20 in a preferred embodiment. In these figures the engine is or may be generally similar to that in the preceding embodiment except for the provision of a relatively long diffuser cowl 200, with a normally closed substantially annular gap 200c intermediate the ends thereof, defined between the respective forward and aft sections 200a and 200b of this outer cowl. The after end of the aft cowl section 200b is located only slightly forwardly of the jet nozzle proper 202. The latter, for thrust-reversal applications, is defined or formed by a thrust-reversing nozzle mechanism essentially similar to that illustrated and described in connection with the first-mentioned embodiment, and therefore needs no separate description herein. The cowl ring 16c thereof corresponds to the cowl ring 16c in FIGURE 1, as does the main cowl 16. The tail cone or plug 20 is or may be the same as in the preceding case. The long duct through which fan-driven air normally discharges to augment jet thrust is formed between the inside wall of the diffuser cowl 200 and the exterior surface of the main cowl 16.

The gap or port 200c is normally closed by a circumferentially extending series of doors 204 which, in their closed position, present outside surfaces which are substantially flush and continuous with the outer surface of the diffuser cowl 200 so as to present a smooth and dragless aerodynamic configuration.

In this embodiment also the annular or substantially annular fan duct passage 206 defined between the coaxial diffuser cowl 200 and main cowl 16 undergoes a diameter expansion rearwardly at the approximate location of the side port 200c. The outer wall of the expanding or tapering portion of this duct is defined in part by the inside surface 208a of the movable cowl ring 208 which, as in the preceding embodiment, is mounted on a plurality of cantilever arms 210 guided for longitudinal movement through the medium of rollers 212 and a guide track 214 engaged by the rollers. Actuators 216 connected to the reversing deflectors 218 are coupled to the ring 208 at spaced points around its circumference through the dog-leg links 220 as in the preceding embodiments.

In the extended position of the ring 208, a substantially annular gap is formed in the outer wall of the air duct 206, which gap is generally in longitudinal registry with the outer cowl port 200c, although offset slightly to the rear thereof. Stops (not shown) limit the extension movement of the ring 208 as in the preceding case. The action of air pressure together with the relative locations of the pivotal connections between the actuator 216 and the deflectors 218, as well as the pivotal connections of the links 220 to the deflectors and ring 208 create the same definite sequential movement of the ring and deflectors as in the previous case.

Figure 17:
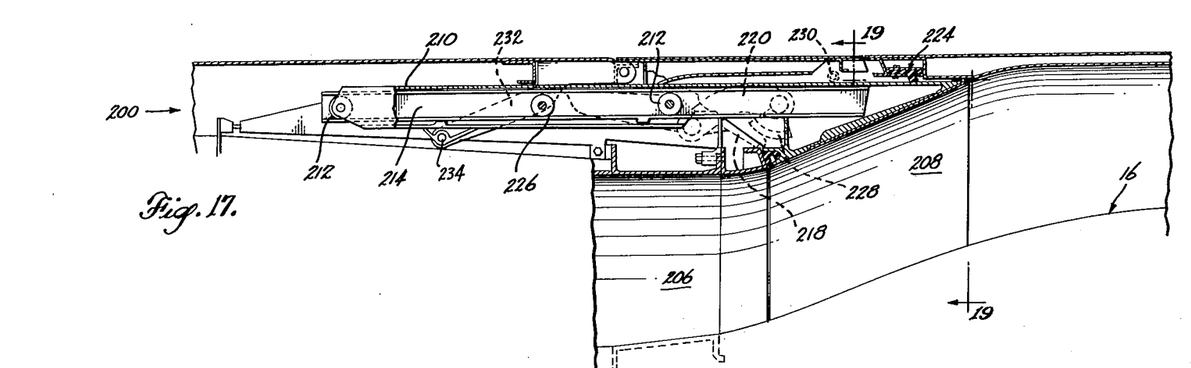
FIGURE 17 is a view generally similar to FIGURE 4 but of the modified forward nozzle structure of FIGURE 15 in forward thrust.
Figure 18:
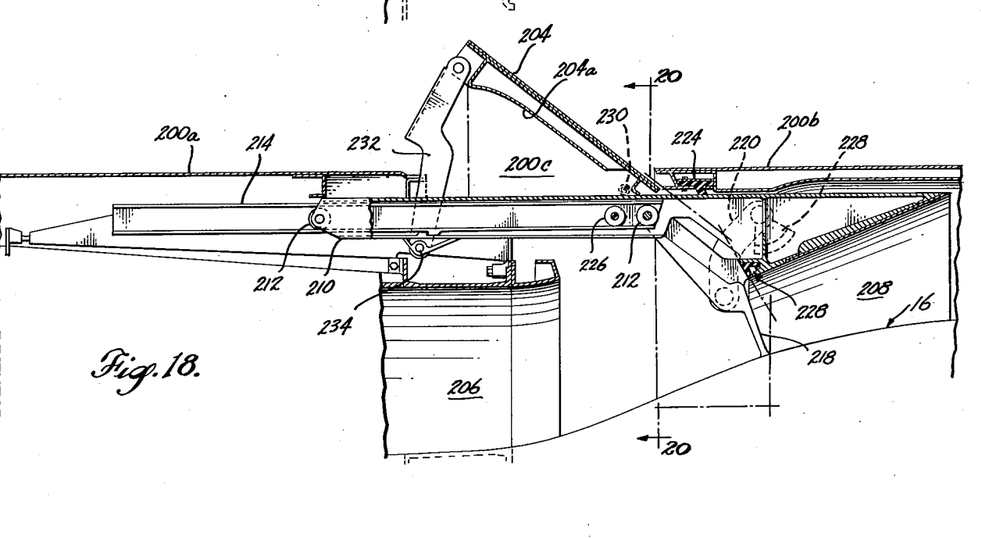
FIGURE 18 shows the same in reverse thrust.
Figure 19:
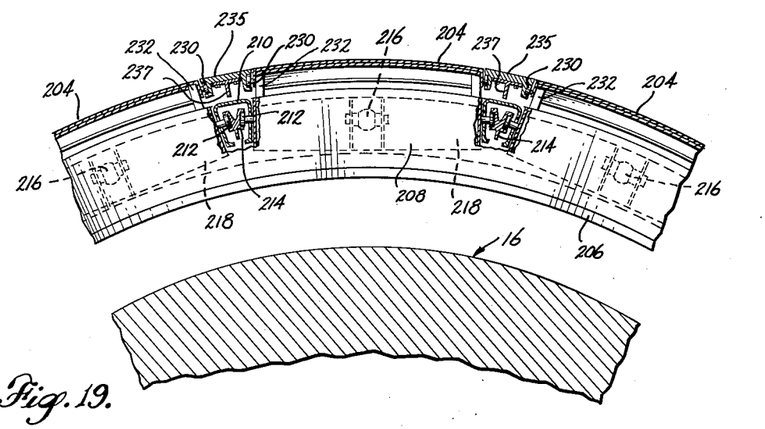
FIGURE 19 is a transverse sectional view taken on the line 19—19 in FIGURE 17.
Figure 20:
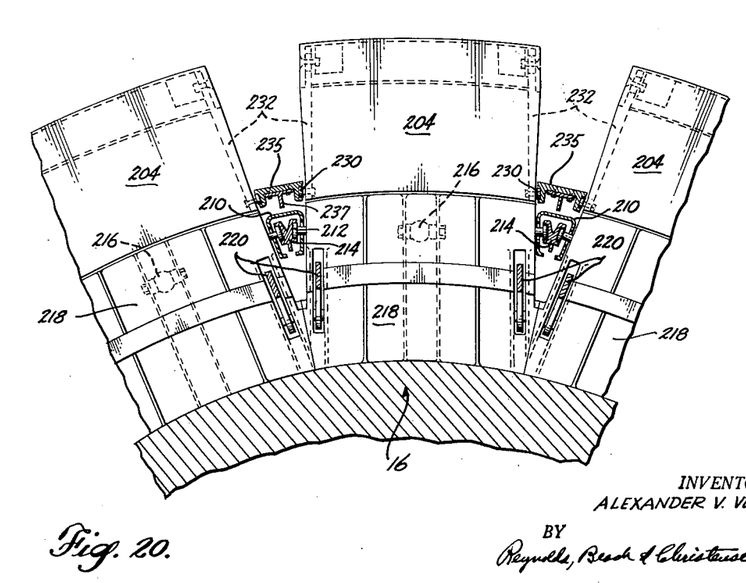
FIGURE 20 is a transverse sectional view taken on line 20—20 in FIGURE 18.

An annular seal means 222 is provided corresponding to the similar means 15, 40b in the previous embodiment to seal the deflectors against flow of air around their outer edges and back into the after portion of the long duct 206 behind these deflectors in their extended position (FIGURE 18); also to seal the forward edge of the cowl ring 208 against the abutting aft edge of the duct wall, in the position of forward thrust (FIGURE 17). A sealing means 224 mounted on the outer wall of the diffuser cowl section 200b and slidably engaging the outer surface of the internal cowl ring 208 seals the gap between these members against leakage of air past the cowl ring and into the after portion of the long duct. The aft, inner edges of the deflectors bear against the main duct (16) exterior surface to prevent appreciable loss of air at this juncture. Abutment of mutually adjacent side edges of the successively adjacent deflectors 218 prevents appreciable loss of air within the region encircled by the seal 228. Thus, virtually all of the air driven rearwardly by the fan is diverted into a forwardly directed path out through the gap 200c when the deflectors 218 are extended as in FIGURE 16.

The forward end portions of the deflectors 218 are guided at opposite side edges by the rollers 226 in the guide tracks 214. Sector gears 228 cooperate as in the preceding embodiment to coordinate movement of the control links 220, hence of the deflectors 218.

Controlled movement of the port doors 204 coordinated with movement of the cowl ring 208 and deflectors 218 is effected by pivotally mounting the doors 204 at their rear edges on pivots 230 and connecting their forward ends through links 232 to pivots 234 on the supporting arms 210. The pivots 230 comprise bearings mounted in recesses formed in opposite sides of the cover channels 235 which are mounted on the T-section longitudinal ribs. The outer surfaces of channels 235 are flush with the diffuser cowl exterior. The pivots 234 are selectively located on the respective arms so that as the arms 210 move aft to extend the cowl ring 208 a longitudinal force is transmitted through the links 232 in an upward and rearward direction which raises the forward edges of the doors 204, ultimately into the position shown in FIGURE 18. These doors, when fully extended, are in substantially coplanar alignment with the respective extended deflectors 218 with which they are circumferentially co-positioned, thereby to provide a substantially continuous directing surface which efficiently guides the air in an outward and forward direction to produce reverse thrust. Preferably the inside surface of the doors 204 comprises a concavely curved panel 204a. With the door extended, this inside surface curves outwardly and forwardly to direct the air efficiently into a forward path of discharge creating maximum reverse thrust.

It will be evident that in both the long duct and short duct forms certain basic features and advantages are provided as described hereinabove. By locating the side port 200c just aft of the fan in the long duct engine, less energy loss is incurred by wall friction in the reverse thrust setting, and somewhat more convenient housing and mounting arrangements for the nozzle parts are possible, as compared with locating these ports near the after end of cowl 200.

These and other aspects of the invention will be evident to those skilled in the art based on an understanding of the present description and drawings of the illustrative embodiments thereof, which are presently the preferred embodiments.

I claim as my invention:

1. In a jet propulsion engine for developing thrust by gaseous discharge, a discharge nozzle means comprising an inner wall structure, a substantially annular outer wall structure at least partially surrounding and spaced outwardly from said inner wall structure to define a rearwardly open gas discharge duct therebetween, said outer wall structure including a stationary forward section and a translating ring section normally drawn forwardly against the after end of said forward section to form in conjunction therewith a substantially continuous outer wall for said discharge duct, means guiding said ring section for translating movement fore and aft, thereby to open and close a side discharge gap between the sections, means limiting rearward movement of said ring section in its aft position, a plurality of thrust-reversing deflector panels, longitudinally extending guide means for such panels mounted on said forward section at intervals about the outer wall of said duct, said deflector panels being pivotally and translationally connected to said guide means at a relative forward location on said panels to permit longitudinal translation of said panels accompanied by pivoting thereof about transverse axes, linkage means connecting said panels at a relatively rearward location thereon pivotally to said ring section to permit swinging of the panels about their forward pivots and to constrain the ring section, in the retracted and extended positions of the panels, to translate fore and aft therewith respectively, such panels in extended position projecting outwardly and forwardly from proximity to said inner wall structure at a location aft of said gap, thereby to block such discharge to the rear and direct such discharge laterally outwardly and forwardly through the open gap, actuating means operatively connected to the panels to move the same, and through them the ring section, fore and aft, and to move the panels between extended and retracted position, movement of the panels into their extended position being permitted by swinging of said linkage means on their respective ring section pivotal connections with the ring section in its aft position, and stop means limiting the aft movement of the ring section at a definite position short of the full aft stroke of the actuating means, whereby completion of such stroke thereafter effects extension of the panels, the panels and linkage means connecting the same to the ring section being adapted to permit the panels to remain retracted during ring section extension movement and to permit the ring section to remain extended during panel retraction movement, said panels being formed for actuation by duct gas pressure developing panel-positioning forces therefrom urging the panels to swing outwardly about their pivotal guide connections and thereby toward retracted position during panel and ring-section extension, said forces being overcome to extend the panels fully by the continued aft movement of the actuating means with the ring section extended, and developing forces on the panels urging the same to swing aft about their linkage pivots and into fully extended position upon approaching such position, independently of force from the actuating means, such latter forces, with the panels extended, thereby also acting through said linkages to hold the ring section extended while the panels are extended and also during initial retraction movement of the panels.

2. The combination defined in claim 1, wherein the duct outer wall formed by the internal surface of the ring section is rearwardly divergent, whereby duct gas pressure acting thereon urges the same forwardly toward retracted position independently of force from the actuating means.

3. The jet propulsion engine nozzle means defined in claim 1, and substantially annular sealing means carried by the forward end of said ring section and engageable with the aft end of the stationary forward section, the deflector panels in extended position being engageable with said sealing means with said ring section extended.

4. In a jet propulsion engine, discharge nozzle means comprising an outer duct wall including a substantially fixed forward wall section and a longitudinally movable aft ring section, means mounted on the nozzle guiding said ring section to permit movement thereof between a forward position substantially contiguous to said forward wall section, and a rearward position displaced aft from said forward wall section to form a discharge gap therebetween, a plurality of deflector panels mounted in the nozzle at intervals about the periphery of said wall, actuator means to move said panels conjointly fore and aft and support the same on transverse pivots at relatively forward locations on the respective panels to permit associated pivoting thereof between retracted position extending generally parallel to the direction of discharge through the nozzle and extended position inclined generally outwardly and forwardly to the direction of such discharge displaced to the rear of said opening, thereby to deflect nozzle discharge outwardly and forwardly through said opening, said actuator means being operable to apply extension and retraction forces to the panels through the aforementioned transverse pivots in lines which extend longitudinally of the nozzle, said panels being formed for biasing thereof by duct gas pressure urging such panels to swing outwardly toward retracted position about their transverse pivots, and links directly interconnecting said ring section and at least certain of said panels, said panels connecting said actuator means to the ring section through said links to effect movement of the ring section through operation of the actuator means, each of said links being pivotally connected on a transverse pivot to its associated panel at a relatively rearward location on the panel and being pivotally connected on a transverse pivot to the ring section at a relative location thereon which, with the panel in retracted position, is displaced laterally inwardly from the line of actuator force applied to the panel, stop means for the ring section establishing the rearward position thereof at a location short of the full stroke of the actuator means, whereby such panels and links swing inwardly during the final phase of the actuator stroke with the ring section in its rearward position, stop means on the ring section limiting outward swinging of the after ends of the panels about their respective actuator means pivots under outwardly acting discharge pressures when the panels are out of their extended position, and stop means on the ring section limiting rearward swinging of the forward ends of the panels about their respective link connections under rearwardly acting discharge pressures with the panels in their extended position, whereby forward movement of the panels by the actuator means precedes retraction movement of the ring section by force transmitted through the panels and links.

5. The nozzle means defined in claim 4, wherein the ring section has an internal wall which flares rearwardly, thereby to apply a forwardly directed force component to the actuator means resulting from discharge pressures on said wall with the panels out of extended position.

6. In a ducted fan type turbojet propulsion engine for developing thrust by gaseous discharge, discharge nozzle means comprising inner and outer wall members defining a rearward discharge duct therebetween, said outer wall member having a longitudinally movable section with an inside surface inclined to the direction of discharge, said inner wall member being similarly inclined, whereby forwardly directed force is exerted on said movable section by duct gas pressure, means to move said movable section fore and aft to open and close a side opening in said outer wall member, deflector means pivotally mounted on one wall member to swing from retracted position extending generally parallel to such wall member into extended position extending across said duct at a location rearwardly of said opening and at an incline relative to the rearward direction of flow of gases, thereby to deflect gases outwardly and forwardly through said opening, actuator means pivotally connected to said deflector means and coordinating means cooperating with said actuator means to effect conjoint rearward movement of said movable section and deflector means followed by pivotal extension movement of said deflector means, said coordinating means including linkage means pivotally interconnecting said movable section and said deflector means, the outer wall movable section comprising the after end of the outer wall member and, in conjunction with the inner wall member, defining a fan-driven air discharge orifice for the nozzle, said inner wall member comprising the main cowl for the turbojet engine, projecting rearwardly from said orifice.

References Cited in the file of this patent

UNITED STATES PATENTS

| 2,520,967 | Schmitt | Sept. 5, 1950 |
| 2,527,732 | Imbert | Oct. 31, 1950 |
| 2,841,954 | Rainbow | July 8, 1958 |
| 2,933,890 | Morrison | Apr. 26, 1960 |
| 2,950,595 | Laucher et al. | Aug. 30, 1960 |
| 2,954,668 | Plummer | Oct. 4, 1960 |

FOREIGN PATENTS

| 1,092,654 | France | Nov. 10, 1954 |